No. 770,085. Patented September 13, 1904.

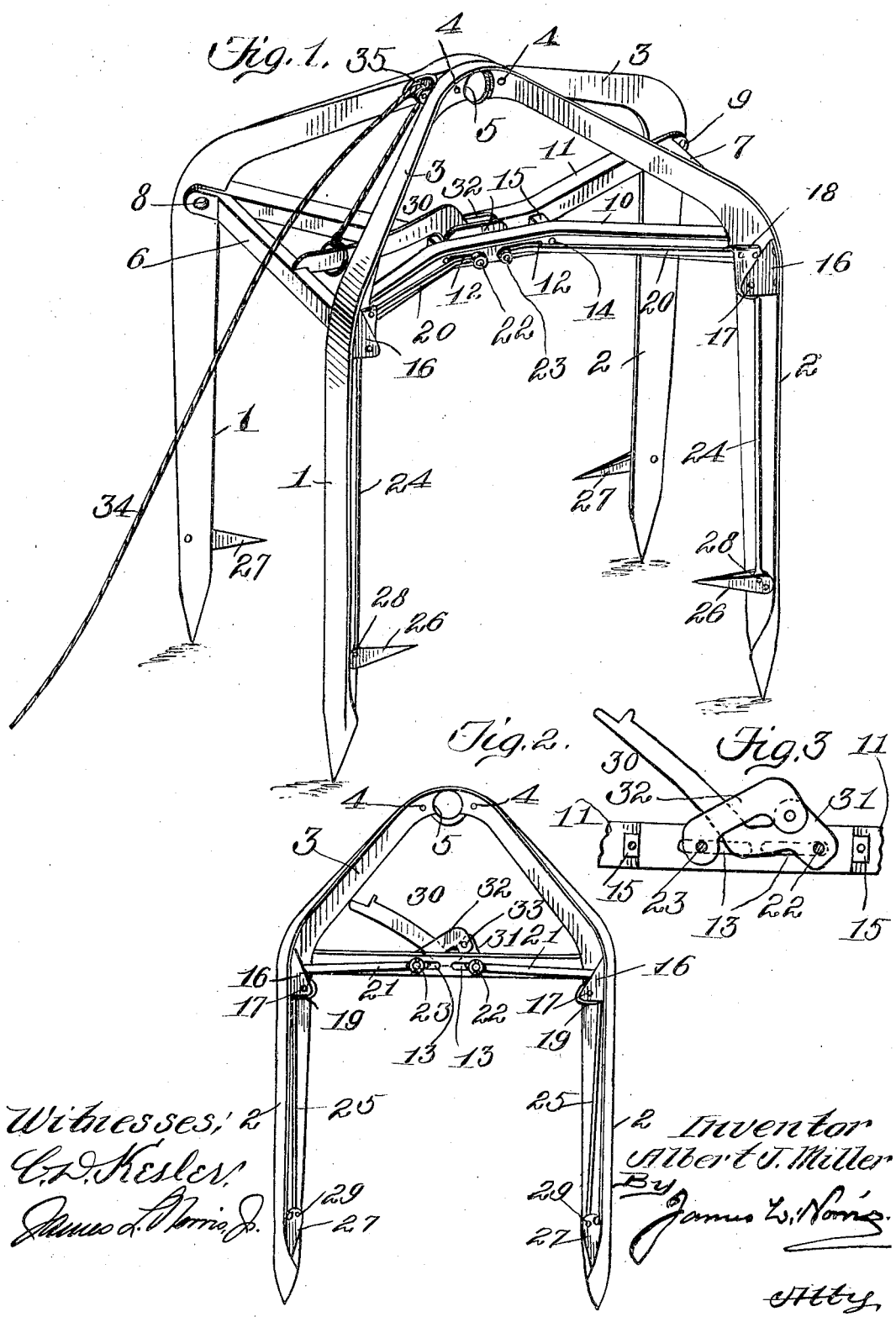

UNITED STATES PATENT OFFICE.

ALBERT J. MILLER, OF BROWNS, ILLINOIS.

HORSE HAY-FORK.

SPECIFICATION forming part of Letters Patent No. 770,085, dated September 13, 1904.

Application filed May 7, 1904. Serial No. 206,875. (No model.)

*To all whom it may concern:*

Be it known that I, ALBERT J. MILLER, a citizen of the United States, residing at Browns, in the county of Edwards and State of Illinois, have invented new and useful Improvements in Horse Hay-Forks, of which the following is a specification.

This invention relates to horse hay-forks.

The invention aims to provide a hay-fork which shall be capable of lifting large bulks or bundles of hay or straw and deposit the same without scattering on the mow or stack.

The invention further aims to construct a horse hay-fork which shall be simple in its construction, strong, durable, efficient in its use, and comparatively inexpensive to manufacture.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 1 is a perspective view of the horse hay-fork constructed in accordance with this invention. Fig. 2 is a side elevation thereof, and Fig. 3 is a detail view of the setting-lever.

The fork, as more specifically set forth hereinafter, is what may be termed a "quadruple-tined" fork and is constructed of two sections suitably secured together, each section comprising a pair of tines, a pair of holding-barbs, and actuating means for setting the barbs to their holding position. The fork further comprises a single set-lever for operating the means for setting the barbs.

Referring to the drawings by reference characters, each of the sections comprises a pair of vertically-extending members 1 2, having the lower end thereof pointed, and said members form the tines of the fork and are connected at their top by what may be termed an "arch" 3. The tines 1 2 and the arch 3 of each section are constructed of a single piece of metallic material substantially angular in cross-section. The tine 1 and that portion of the arch therefor of each section extend in a radial manner with respect to the center of the fork, and the tine 2 and that portion of the arch 3 therefor of each section extend in a radial manner with respect to the center of the fork. The arch 3 of each section extends toward each other and the arches at their top abut against each other and are secured together at their abutting points through the medium of the holdfast devices 4. The top of each of the arches 3 is provided with an opening 5, the opening in one arch registering with the opening in the other arch, and the said openings are adapted to receive the lifting-cable for the fork.

The fork is provided at each side with a pair of brace members, (indicated by the reference characters 6 7.) The member 6 is arranged between the tines 1, as well as having its ends secured to the tines 1 at the top thereof by the holdfast devices 8. The member 7 is arranged between the tines 2, as well as having its ends secured to the tines 2 at the top thereof by the holdfast devices 9. The members 6 7 not only form braces, but are also adapted to space the tines 1 and 2 apart.

The fork is further provided with a pair of supporting brace members 10 11. These members 10 11 are arranged within the fork and are substantially V-shaped in contour, and the member 10 has one end secured to the tine 1 and its other end secured to the tine 2 of one section, and the member 11 has one end secured to the tine 1 and its other end to the tine 2 of the other section. The central portion of the members 10 11 extend in a longitudinal manner and parallel with one another, and said longitudinally-extending portion of each of the members 10 11 is provided with a pair of slots 12 13. The slots of one member are arranged parallel with the slots of the other member. The longitudinally-extending portions of the members 10 and 11 are connected together, but do not abut, and for this purpose the connecting means consists of the holdfast devices 14, carrying the spacing-collars 15, these latter being interposed between the longitudinally-extending portions of the members 10 11. The space formed between the longitudinally-extending portions of the members 10 11 is provided to permit of the operation of the setting-lever and its connection, which will be hereinafter referred to. The brace members 6 7 and the brace members 10 11 are formed of suitable metallic material and are preferably angular in cross-section.

The tines 1 2 of each section at the top thereof have secured thereto an inwardly-extending protuberance 16, which extends parallel with one face of the tines, but does not abut against said face, thereby forming a space between the protuberance and its respective tine. The protuberance 16 and its respective tine are adapted to support a stationary pivot 17. Mounted upon the pivot 17 of each of the tines 1 is a rocking plate 18, and mounted upon the pivot 17 of each of the tines 2 is a rocking plate 19. The plates 18 and 19 operate between the protuberances and the tines.

The reference character 20 denotes a pair of actuating-arms, and the reference character 21 denotes a pair of actuating-arms. The actuating-arms 20 are employed in connection with the tines 1, and the actuating-arms 21 are employed in connection with the tines 2. One end of each of the actuating-arms 20 is fixedly secured to a pin 22, extending through the slots 12, and the other end of the arms 20 is pivotally connected to the rocking plates 18. One end of the arms 21 is fixedly secured to a pin 23, extending through the slots 13, and the other end of said arms 21 is pivotally connected to the rocking plates 19.

The reference character 24 denotes a shifting rod, there being a shifting rod 24 for each of the tines 1.

The reference character 25 denotes a shifting rod, there being a shifting rod for each of the tines 2. The upper end of the rods 24 is pivotally connected to the rocking plates 18, while the lower end of said rods 24 is pivotally connected to the holding-barbs 26. The holding-barbs 26 are pivotally connected to the tines 1, near the lower end thereof, there being a holding-barb for each tine 1. The upper end of the shifting rods 25 is pivotally connected to the rocking plates 19, while the lower end of said rods 25 is pivotally connected to the holding-barbs 27, which are in turn pivotally connected to the tines 2, near the lower end thereof, there being a single holding-barb for each of the tines 2. The holding-arms 24 are pivoted to the barbs 26, as at 28, and the holding-arms 25 are pivoted to the barbs 27, as at 29.

The setting-lever for causing the holding-barbs to assume their operative position is indicated by the reference character 30, and the lower end of said lever is provided with an enlarged L-shaped portion 31. Said portion 31 operates in the space between the brace members 10 11 and is pivotally mounted upon the pin 22. The pin 23 is connected with the L-shaped portion 31 of the setting-lever 30 through the medium of a pair of bow-shaped links 32. These links are pivoted, as at 33, to the lever 30, and their other ends are pivotally mounted upon the pin 23. By such an arrangement when the lever 30 is lowered it causes the simultaneous moving of the holding-barbs to their operative positions, and when the lever is elevated in a manner as hereinafter set forth to nearly a vertical position the weight of the hay will cause the barbs to assume their inoperative position, and such action will be had owing to the connection between the lever and the pins 22 23.

The lever 31 is moved from its locking position through the medium of a trip-rope 34, which is connected thereto and passes over a pulley 35, suspended from near the top of the arches 3. The trip-rope 34 extends exterior of the fork—that is to say, it is arranged after its passage over the pulley on the outside of the member 6.

The fork being constructed substantially as hereinbefore set forth will operate as follows: Assuming that the barbs are in their inoperative positions—that is to say, extending parallel with the tines—the fork is lowered and the tines forced into the hay until they have penetrated the desired distance. The set-lever is then moved so the free end thereof will engage the brace member 6, and by such operation of the said lever it will force the pins 22 23 to the inner end of the slots 12 13, carrying the arms 20 and 21 therewith, which in turn will operate the shifting rods 24 25, elevating the same, which in turn will cause the barbs to extend in a lateral direction—that is to say, will cause the barbs to extend at an angle with respect to the tines. The fork is then elevated. When the fork, with its load, has reached the desired point, a pull on the trip-rope 34 will elevate the setting-lever 30 to a vertical or substantially a vertical position, thereby releasing the barbs, and the weight of the load will cause the barbs to assume their inoperative position—that is to say, as the hay escapes from the fork the same will cause the barbs to assume their inoperative position. After the hay has escaped from the fork the latter is again in position to receive the load, and the operation is then continued in the manner as hereinbefore set forth.

It is thought the many advantages of a horse hay-fork constructed in accordance with the foregoing description, taken in connection with the accompanying drawings, can be readily understood, and it will furthermore be understood that changes, variations, and modifications can be resorted to without departing from the spirit of the invention or sacrificing any of its advantages, and I therefore do not wish to restrict myself to the details of construction hereinbefore described and as set forth in the annexed drawings, but reserve the right to make such changes, variations, and modifications as come properly within the scope of the protection prayed.

Having thus fully described my invention, what I claim as new, and desire to secure by Letters Patent, is—

1. A hay-fork comprising two pair of tines, brace members connected thereto, a pair of pins sliding in said brace members, barbs pivotally connected to the tines, an actuating connection between said pins and said tines, a setting-lever connected with the pins for simultaneously operating them, thereby operating said actuating means and moving the barbs, and a trip-cable connected to said lever and adapted to release the lever when the trip-cable is pulled.

2. A hay-fork comprising two pair of tines, a connecting-arch for each pair of the tines, means for securing the connecting-arches together at the top thereof, braces for spacing the tines apart, supporting brace members arranged between and secured to the tines, barbs pivoted to the tines, actuating means for moving the barbs to operative position, a setting-lever operating between said supporting brace members and connected to said actuating means for operating it, and a trip-cable supported by the arches and connected to said lever and adapted when pulled to release the lever to permit of the barbs assuming their inoperative position.

3. A hay-fork comprising two pair of tines, a supporting brace member connected to each pair of tines, and provided with a pair of slots, the slots of one member in alinement with the slots of the other member, a pin operating in one pair of said slots, a pin operating in the other pair of said slots, barbs pivoted to the tines, an actuating connection between the barbs and the pins, and means connected with the pins and adapted when operated to operate the actuating means, thereby moving the barbs to operative position.

4. A hay-fork comprising two pairs of tines, a supporting brace member connected to each pair of tines, and provided with a pair of slots, the slots of one member in alinement with the slots of the other member, a pin operating in one pair of said slots, a pin operating in the other pair of said slots, barbs pivoted to the tines, an actuating connection between the barbs and the pins, means connected with the pins and adapted when operated to operate the actuating means, thereby moving the barbs to operative position, and means adapted when operated to release the barbs to permit of their returning to inoperative position.

5. A hay-fork comprising a pair of tines, an arch for connecting each pair of tines together, means for connecting the arches together, a supporting brace member for each pair of tines, each of said members provided with a pair of slots, the slots of one member in alinement with the slots of the other member, a pin extending through each pair of alining slots, a rocking plate pivoted to each of the tines, a barb pivoted to each of the tines, a shifting connection for the barbs suitably connected with the plates and with the barbs, actuating-arms connected to the pins and the plates, and means connected with the pins for operating them, causing thereby the operation of said arms and said shifting means and imparting suitable movement to the barbs.

6. A hay-fork comprising two sections, each of said sections consisting of a pair of tines connected together at their top by arches, a barb pivotally connected to the tines of each section, a rocking plate pivotally supported upon the tines of each section, a shifting rod pivotally connected to each of the tines and each of the rocking plates, an actuating-arm for each of the rocking plates, and means connected to the said arms for simultaneously operating them, thereby moving the barbs to operative position.

7. A hay-fork comprising two sections, each of said sections consisting of a pair of tines connected together at their top by arches, a barb pivotally connected to the tines of each section, a rocking plate pivotally supported upon the tines of each section, a shifting rod pivotally connected to each of the tines and each of the rocking plates, an actuating-arm for each of the rocking plates, means connected to the said arms for simultaneously operating them, thereby moving the barbs to operative position, and means for releasing the barbs to permit of their returning to inoperative position.

8. A hay-fork comprising two sections, each said sections consisting of a pair of tines connected together at their top by arches, a barb pivotally connected to the tines of each section, a rocking plate pivotally supported upon the tines of each section, a shifting rod pivotally connected to each of the tines and each of the rocking plates, an actuating-arm for each of the rocking plates, a pair of pins, each of said pins adapted to connect a pair of actuating-arms together, and means connected with the pins and adapted when operated to actuate said arms, thereby shifting said barbs to operative position.

9. A hay-fork comprising two pair of tines, an arch for connecting each pair of tines together, means for connecting the arches together, a supporting brace member for each pair of tines, each of said members provided with a pair of slots, the slots of one member in alinement with the slots of the other member, a pin extending through each pair of alining slots, a rocking plate pivoted to each of the tines, a barb pivoted to each of the tines, a shifting connection for the barbs suitably connected with the plates and with the barbs, actuating-arms connected to the pins and the plates, means connected with the pins for operating them, causing thereby the operation of said arms and said shifting means and imparting suitable movement to the barbs, a pair of pins, each of said pins adapted to connect a pair of actuating-arms together, means connected with the pins and adapted when operated to actuate said arms, thereby shifting said barbs to operative position, and means for releasing the barbs to permit of their return to inoperative position.

10. A hay-fork comprising a plurality of tines, a plurality of barbs carried by the tines, means for shifting said barbs to inoperative position, a pair of sliding pins for operating said means, and a lever connected with said pins for operating them.

11. A hay-fork comprising a plurality of tines, a plurality of slotted supporting brace members suitably connected with the tines, a plurality of shiftable barbs suitably connected with the tines, means pivotally supported upon the tines for shifting the barbs, a pair of slidable pins operating in said brace members and connected with said means and adapted when operated to actuate said means, and means connected to said pins for operating them.

12. A hay-fork comprising a plurality of tines, a plurality of slotted supporting brace members suitably connected with the tines, a plurality of shiftable barbs suitably connected with the tines, means pivotally supported upon the tines for shifting the barbs, a pair of slidable pins operating in said brace members and connected with said means and adapted when operated to actuate said means, a lever connected to one of said pins, and a pair of links for connecting said lever to the other of said pins, said lever when operated adapted to simultaneously actuate the pins.

13. A hay-fork comprising a plurality of tines, a plurality of slotted supporting brace members suitably connected with the tines, a plurality of shiftable barbs suitably connected with the tines, means pivotally supported upon the tines for shifting the barbs, a pair of slidable pins operating in said brace members and connected with said means and adapted when operated to actuate said means, a lever connected to one of said pins, a pair of links for connecting said lever to the other of said pins, said lever when operated adapted to simultaneously actuate the pins, and a trip-cable connected with the lever for releasing it thereby permitting of the barbs assuming an inoperative position.

In testimony whereof I have hereunto set my hand in presence of two subscribing witnesses.

ALBERT J. MILLER.

Witnesses:
F H. HORTON,
W. L. WHEELER.